United States Patent
Bahl et al.

(10) Patent No.: US 10,271,220 B2
(45) Date of Patent: Apr. 23, 2019

(54) WIRELESS COMMUNICATION USING A CENTRAL CONTROLLER

(71) Applicant: Microsoft Technology Licensing, LLC., Redmond, WA (US)

(72) Inventors: Paramvir Bahl, Bellevue, WA (US); Yongguang Zhang, Medina, WA (US); Bo Chen, San Bruno, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 146 days.

(21) Appl. No.: 15/043,329

(22) Filed: Feb. 12, 2016

(65) Prior Publication Data

US 2017/0238191 A1 Aug. 17, 2017

(51) Int. Cl.
*H04W 16/20* (2009.01)
*H04W 4/02* (2018.01)
(Continued)

(52) U.S. Cl.
CPC .............. *H04W 16/20* (2013.01); *G01S 5/02* (2013.01); *H04B 7/0617* (2013.01); *H04W 4/02* (2013.01);
(Continued)

(58) Field of Classification Search
CPC ....... H04W 16/20; H04W 4/02; H04W 48/16; H04B 7/0617
See application file for complete search history.

(56) References Cited

U.S. PATENT DOCUMENTS 8,194,587 B2 6/2012 Bennett
2004/0198220 A1* 10/2004 Whelan ................. H04W 12/06
455/41.1
(Continued)

FOREIGN PATENT DOCUMENTS

EP 2207267 B1 7/2015
JP 2006-203674 A * 8/2006
(Continued)

OTHER PUBLICATIONS

Hsu, et al, "Client-AP Association for Multiuser MIMO Networks", In Proceedings of IEEE International Conference on Communications, Jun. 8, 2015, pp. 1-30.
(Continued)

*Primary Examiner* — Noel R Beharry
*Assistant Examiner* — Wilfred Thomas
(74) *Attorney, Agent, or Firm* — International IP Law Group, PLLC (57) ABSTRACT

An example method for managing a wireless network can include receiving, via a processor, an access point (AP) beam shape and an AP transmit direction corresponding to each of a plurality of access points (APs). The example method can also include receiving, via a processor, a client device beam shape profile from at least one of the plurality of access points. The example method can also further include calculating, via the processor, a location of a blocking object based on the AP beam shape, the AP transmit direction, and the client device beam shape profile from the plurality of access points. The example method can further include allocating, via the processor, client-to-AP associations based at least in part on the location of the blocking object.

21 Claims, 6 Drawing Sheets

(51) Int. Cl.

| | |
|---|---|
| *H04W 16/28* | (2009.01) |
| *H04W 64/00* | (2009.01) |
| *G01S 5/02* | (2010.01) |
| *H04W 48/16* | (2009.01) |
| *H04B 7/06* | (2006.01) |
| *H04W 4/80* | (2018.01) |
| *H04B 7/0408* | (2017.01) |
| *H04W 4/04* | (2009.01) |

(52) U.S. Cl.
CPC ........... *H04W 16/28* (2013.01); *H04W 48/16* (2013.01); *H04W 64/00* (2013.01); *H04B 7/0408* (2013.01); *H04W 4/023* (2013.01); *H04W 4/043* (2013.01); *H04W 4/80* (2018.02)

(56) References Cited

U.S. PATENT DOCUMENTS

| | | | | |
|---|---|---|---|---|
| 2005/0225439 | A1* | 10/2005 | Watanabe | B62D 15/027 340/435 |
| 2007/0076671 | A1* | 4/2007 | Winget | H04L 63/08 370/338 |
| 2007/0109183 | A1* | 5/2007 | Kimata | H04B 7/0617 342/354 |
| 2010/0150061 | A1* | 6/2010 | Cho | H04W 16/20 370/328 |
| 2011/0182174 | A1* | 7/2011 | Pi | H04W 88/10 370/229 |
| 2011/0287801 | A1 | 11/2011 | Levin et al. | |
| 2011/0305229 | A1 | 12/2011 | Kim et al. | |
| 2013/0109420 | A1* | 5/2013 | Nilsson | H04B 7/024 455/501 |
| 2014/0044042 | A1 | 2/2014 | Moshfeghi | |
| 2014/0070995 | A1* | 3/2014 | Itagaki | H01Q 3/26 342/372 |
| 2014/0269291 | A1* | 9/2014 | Dwivedi | H04W 28/0289 370/232 |
| 2014/0269370 | A1* | 9/2014 | Dharanipragada | H04W 24/02 370/252 |
| 2014/0369394 | A1 | 12/2014 | Ruuska et al. | |
| 2015/0346313 | A1* | 12/2015 | Smith | G01S 5/0252 342/465 |
| 2015/0372740 | A1* | 12/2015 | Ko | H04B 7/0456 370/329 |
| 2016/0212680 | A1* | 7/2016 | Talukdar | H04W 40/12 |

FOREIGN PATENT DOCUMENTS

| | | |
|---|---|---|
| WO | 2014009246 A1 | 1/2014 |
| WO | 2014048715 A1 | 4/2014 |
| WO | 2014154062 A1 | 10/2014 |

OTHER PUBLICATIONS

Saha, et al., "60 GHz Multi-Gigabit Indoor WLANs: Dream or Reality?", In Proceedings of Computer Science—Networking and Internet Architecture, Sep. 2015, pp. 1-13.

Bonald, et al., "Enhanced Spatial Reuse in Multi-Cell WLANs", In Proceedings of 28th IEEE International Conference on Computer Communications, Joint Conference of the IEEE Computer and Communications Societies, Apr. 19, 2009, pp. 1-5.

Arunachalaperumal, et al., "Design of Reconfigurable Parasitic Antenna for Single RF Chain MIMO Systems", In International Journal of Computer, Electrical, Automation, Control and Information Engineering vol. 9, Issue 3, Mar. 2, 2015, pp. 755-758.

Sur, et al., "60 GHz Indoor Networking through Flexible Beams: A Link-Level Profiling", In Proceedings of the ACM SIGMETRICS International Conference on Measurement and Modeling of Computer Systems, Jun. 15, 2015, 14 pages.

Liu, et al., "Pushing the Envelope of Indoor Wireless Spatial Reuse using Directional Access Points and Clients", In Proceedings of the sixteenth annual international conference on Mobile computing and networking, Sep. 20, 2010, 12 pages.

Niu, et al., "A Survey of Millimeter Wave (mmWave) Communications for 5G: Opportunities and Challenges", In Proceedings of the Computing Research Repository, Feb. 2015, pp. 1-17.

Sendra, et al., "WLAN IEEE 802.11a/b/g/n In door Coverage and Interference Performance Study", In International Journal on Advances in Networks and Services, vol. 4, Issue 1-2, Jan. 2011, pp. 209-222.

"Central WiFiManager Software Controller", Published on: Sep. 6, 2015 Available at: http://us.dlink.com/products/business-solutions/centeral-wifimanager-software-controller/.

"TRENDnet Ships AC1200 Dual Band PoE Access Point", Published on: Aug. 28, 2015 Available at: http://efytimes.com/e1/173720/TRENDnet-Ships-AC-Dual-Band-PoE-Access-Point.

International Search Report and the Written Opinion of the International Searching Authority, issued in PCT Application No. PCT/US2017/016317, dated Apr. 6, 2017, 15 pages \* cited by examiner

WIRELESS COMMUNICATION USING A CENTRAL CONTROLLER

BACKGROUND

Various methods exist for increasing wireless LAN capacity to improve user experience. For example, Multiple In, Multiple Out (MIMO) is a method for multiplying the capacity of a radio link using multiple transmit and receive antennas to exploit multipath propagation.

In addition, wireless networking may use any number of bands in multiband devices to increase throughput. For example, the bands used may include the 2.4 GHz, 5 GHz, white space bands such as UHF and VHF, and the 60 GHz band, among other bands.

SUMMARY

The following presents a simplified summary of the innovation in order to provide a basic understanding of some aspects described herein. This summary is not an extensive overview of the disclosed subject matter. It is intended to neither identify key elements of the disclosed subject matter nor delineate the scope of the disclosed subject matter. Its sole purpose is to present some concepts of the disclosed subject matter in a simplified form as a prelude to the more detailed description that is presented later.

An implementation provides for a system for. The system can include a processor and a computer-readable memory storage device storing executable instructions that, based on an execution by the processor, cause the processor to receive an access point (AP) beam shape and an AP transmit direction corresponding to each of a plurality of access points. The instructions can also cause the processor to receive a client device beam shape profile from at least one of the plurality of access points. The instructions can also cause the processor to calculate a three-dimensional location for each access point based on an AP count and a shape of a deployment area. The instructions can also cause the processor to calculate a location of a blocking object based on the AP beam shape, the AP transmit direction, and the client device beam shape profile from the plurality of access points. The instructions can also cause the processor to allocate client-to-AP associations based at least in part on the location of the blocking object.

Another implementation provides a method for managing a wireless network. The method can include receiving, via a processor, an access point (AP) beam shape and an AP transmit direction corresponding to each of a plurality of access points. The method can further include receiving, via a processor, a client device beam shape profile from at least one of the plurality of access points. The method can also include calculating, via the processor, a location of a blocking object based on the AP beam shape, the AP transmit direction, and the client device beam shape profile from the plurality of access points. The method can further include allocating, via the processor, client-to-AP associations based at least in part on the location of the blocking object.

Another implementation provides one or more computer-readable storage devices for storing computer-readable instructions that, when executed by one or more processing devices, instruct the management of a wireless network, the computer-readable instructions including code to receive an access point (AP) beam shape and an AP transmit direction corresponding to each of a plurality of access points. The instructions can also include code to receive a client device beam shape profile from at least one of the plurality of access points. The instructions can also further include code to calculate a three dimensional location for each access point based on an AP count and a shape of a deployment area. The instructions can also further include code to calculate a location of a blocking object based on the AP beam shape, the AP transmit direction, the client device beam shape profile from the plurality of access points, and the calculated location of at least one access point. The instructions can also further include code to allocate client-to-AP associations based at least in part on the location of the blocking object.

The following description and the annexed drawings set forth in detail certain illustrative aspects of the disclosed subject matter. These aspects are indicative, however, of a few of the various ways in which the principles of the innovation may be employed and the disclosed subject matter is intended to include all such aspects and their equivalents. Other advantages and novel features of the disclosed subject matter will become apparent from the following detailed description of the innovation when considered in conjunction with the drawings.

DETAILED DESCRIPTION

As mentioned above, multiple bands can be used to increase wireless throughput. For example, under version 1.1 of the IEEE 802.1 lad standard, released June 2011, tri-band enabled devices operating in the 2.4, 5, and 60 GHz bands can deliver data transfer rates up to 7 gigabits (Gbit) per second. However, the use of 60 GHz bands poses technical problems related to millimeter wavelength bands generally. For example, the 60 GHz band is highly susceptible to physical blockage. Unlike signals in the 2.4 GHz and 5 GHz bands, signals in the 60 GHz band may not pass through objects such as walls, doors, and human bodies. In addition, millimeter wavelength bands are prone to suffer from high attenuation and thus have limited range. Furthermore, current wireless LAN architectures may not take advantage of spatial reuse opportunities that exist when using the 60 GHz wireless band. Spatial reuse, also known as spatial multiplexing, is a transmission technique in MIMO wireless communication to transmit independent and separately encoded data signals, known as streams, from each of the multiple transmit antennas. Therefore, the space dimension is reused, or multiplexed, more than one time.

This disclosure describes techniques for managing wireless communication using a central controller. In embodiments, a plurality of access points may be distributed along a wall or on a ceiling. As used herein, an access point refers to a device with one or more antennas that can send and/or receive wireless transmissions. For example, the plurality of access points can be distributed in a plane parallel to the ground according to any of the densities of deployment discussed with regard to FIG. 1 below. In some examples, the plurality of access points can transmit and receive directed signals at millimeter wavelength bands with one or more clients. The central controller can manage the access points via a separate connection. For example, the separate connection can be wired or wireless. The central controller can calculate a location for each access point based on an access point count and a shape of a deployment area. The central controller can also calculate a location of a blocking object based on a beam shape, a transmit direction, and a client device profile of beam shape from the plurality of access points. The central controller can then allocate client-to-access point (client-to-AP) associations based at least in part on the location of the blocking object. Transmissions between a client and one or more APs can then be initiated by detecting availability of the access points based on a combination of an AP-client association table with an AP configuration mask. The techniques thus enable a wireless network with greatly increased capacity. For example, the techniques may increase a wireless LAN's capacity by several orders of magnitude in comparison to current Wi-Fi based wireless LANs. In addition, the techniques herein enable a form of private wireless communication to be used indoors. For example, since signals in the 60 GHz band cannot pass through walls, using the 60 GHz band exclusively may result in a private wireless network that cannot be detected outside the walls. In addition, no information exchanges may take place directly between clients, providing for additional privacy between client devices. Furthermore, the techniques reduce runtime cost via methods reducing the occurrence of handoffs, or changes in client-AP associations. Thus, the techniques can include a configuration method with a linear time complexity that can efficiently scale with an increasing number of clients. In addition, the techniques provide environmental robustness by efficiently handling transmission blockages in a variety of complex deployment areas. Moreover, APs can be distributed according to a deployment density that increases spatial reuse. Therefore, the techniques also increase efficiency of band usage. Finally, the techniques are client agnostic, and therefore can accommodate different physical-layers and diverse beam patterns. These techniques are described in more detail herein.

Figure 5:
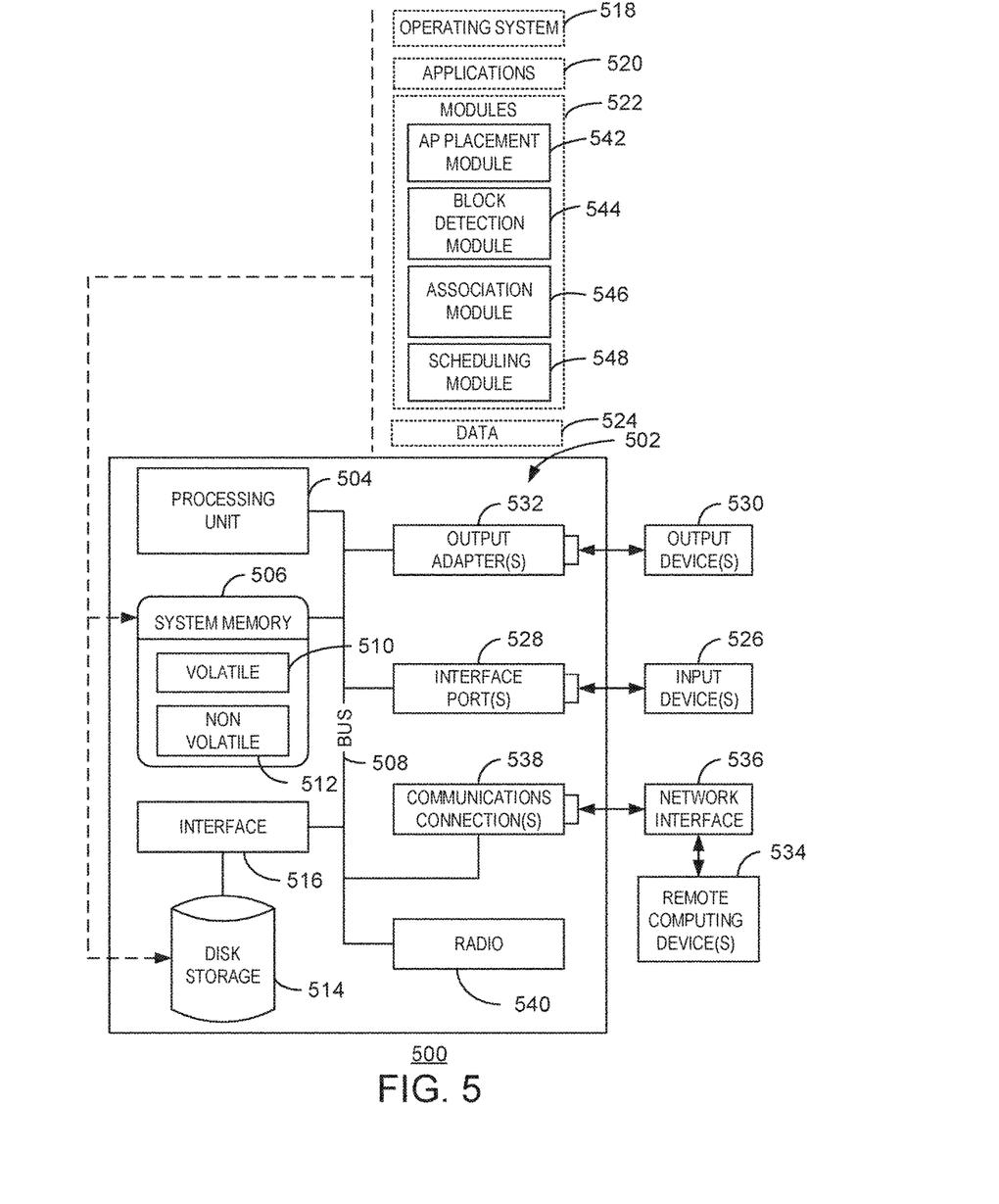
FIG. 5 is a block diagram of an example system for managing wireless communication.

As a preliminary matter, some of the figures describe concepts in the context of one or more structural components, variously referred to as functionality, modules, features, elements, or the like. The various components shown in the figures can be implemented in any manner, such as software, hardware, firmware, or combinations thereof. In some cases, various components shown in the figures may reflect the use of corresponding components in an actual implementation. In other cases, any single component illustrated in the figures may be implemented by a number of actual components. The depiction of any two or more separate components in the figures may reflect different functions performed by a single actual component. FIG. 5, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into multiple component blocks, and certain blocks can be performed in an order that differs from that which is illustrated herein, including a parallel manner of performing the blocks. The blocks shown in the flowcharts can be implemented by software, hardware, firmware, manual processing, or the like. As used herein, hardware may include computer systems, discrete logic components, such as application specific integrated circuits (ASICs), or the like.

As to terminology, the phrase "configured to" encompasses any way that any kind of functionality can be constructed to perform an identified operation. The functionality can be configured to perform an operation using, for instance, software, hardware, firmware, or the like. For example, the phrase "configured to" can refer to a structure of an associated hardware element that can implement the associated functionality. The phrase "configured to" can also refer to the coding design of associated structural coding elements such as modules to implement the associated function of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts of FIGS. 3-4 below corresponds to logic for performing that operation. An operation can be performed using, software, hardware, firmware, or the like. The terms. "component," "system," and the like may refer to computer-related entities, hardware, and software in execution, firmware, or combination thereof. A component may be a process running on a processor, an object, an executable, a program, a function, a subroutine, a computer, or a combination of software and hardware. The term. "processor." may refer to a hardware component, such as a processing unit of a computer system.

Furthermore, the disclosed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media include magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals.

Figure 1:
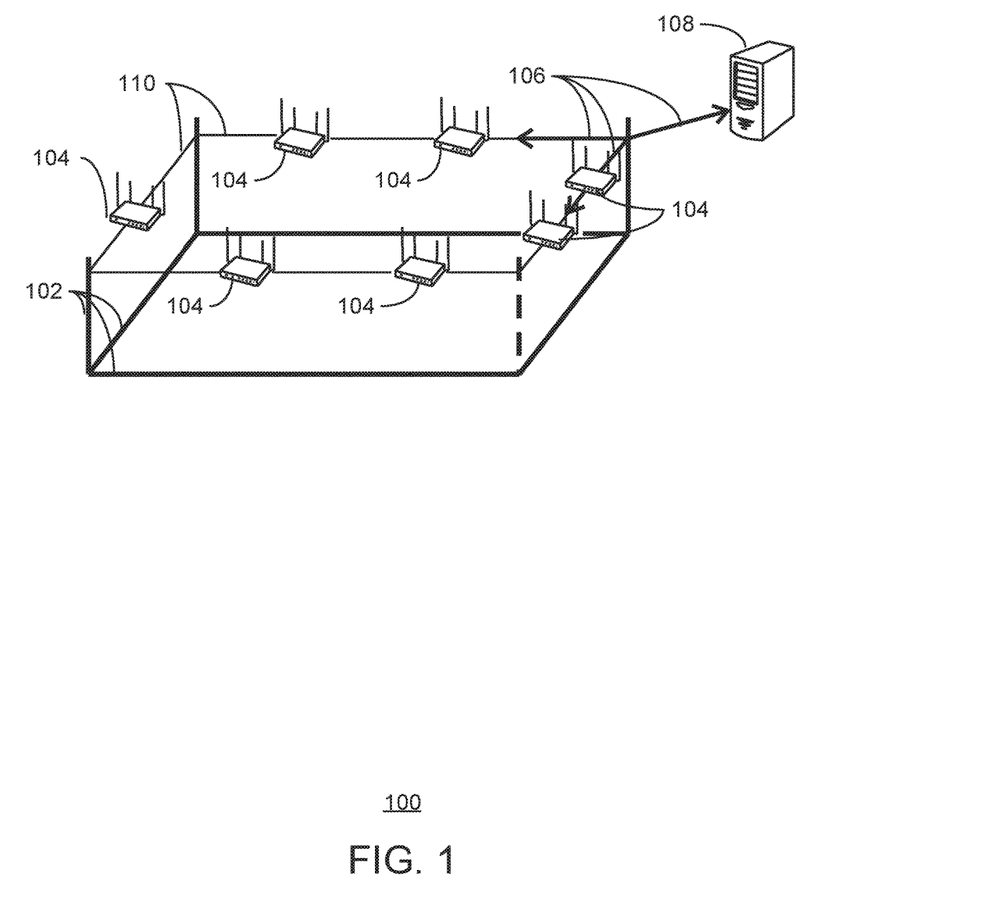
FIG. 1 is a block diagram of an example operating environment configured for implementing various aspects of the techniques described herein.

FIG. 1 is a block diagram of an example operating environment configured for implementing various aspects of the techniques described herein. The example operating environment of FIG. 1 is referred to generally by the reference number 100.

The example operating environment 100 includes a deployment area 102 including a plurality of access points 104. For example, the deployment area 102 may be any area with walls, such as a conference hall or a railway station. Although a room with four walls is shown in the example environment 100, environments with fewer or more than four walls may use the techniques described herein. In some examples, the techniques may be used in environments open to the outside. The plurality of access points 102 are shown distributed along the walls of the deployment area 102. For example, the access points 102 can be single radio frequency (RF) chain access points (APs) that can operate at millimeter wavelength bands. In some examples, the access points may operate at the 60 GHz band using one or more channels. The operating environment further includes a link 106 between the access points and a central controller 108. For example, the central controller 108 may be the computing device 502 of FIG. 5 below. The central controller 108 is connected via the link 106 to each of the access points 104. In some examples, the link 106 may be a wired connection. In some examples, the link 106 can be a wireless connection.

In the example operating environment 100, the plurality of access points 102 are evenly distributed along the walls of the deployment area 102 along a plane that is parallel to the floor, and yet closer to the ceiling than the floor. Each of the access points 102 may be approximately at the same height from the ground. In any case, the access points 102 can be located at a height above the height of any client devices as discussed in detail with respect to FIG. 2 below. Because the AP placement in the deployment area 102 is not universally symmetric, the density of the AP deployment may also not be uniform. As covering range is proportional to distance, the spatial reuse opportunity away from a wall will be less than at a position close to the wall. Thus, higher placement of APs along walls in deployment areas with high ceilings will result in a longer distance from the APs to clients and reduced spatial reuse opportunity. From a client perspective, there may be two kinds of spatial reuse. The first kind of spatial reuse is due to different locations of the clients. Since each AP has directionality in transmission, the transmission can affect a limited region in the client layer. If there are N of such regions with no overlap in the client layer, then N instances of spatial reuse, or streams, can be achieved in the client layer. The second kind of spatial reuse is due to different directions of transmissions. Since each client device has directionality in transmission, even when multiple client devices are close to each other, the multiple client devices can connect to multiple APs from different angles at the same time. Assuming M links with different directions can be established at the same time at the same location, then M instances of spatial reuse, or streams, can be achieved at this location. The overall spatial reuse potential for the deployment area 102 can thus be estimated using the equation:

$$\Sigma_{i=1}^{N} M(i), \quad \text{(Eq. 1)}$$

where M(i) is the spatial reuse fact at location i.

Therefore, given a height difference between the AP layer and the client layer $\Delta h$, a horizontal distance from client to AP $d(\emptyset)$, wherein $\emptyset$ is the orientation, and W is a beam width, an optimal AP deployment density D can be calculated using the equation:

$$D = \int_{\emptyset} \frac{m(d(\emptyset))}{\pi(\Delta h^2 + d(\emptyset)^2)\tan^2(W/2)^2} \Delta\emptyset \text{ where} \quad \text{(Eq. 2)}$$

$$m(d(\emptyset)) = \left\lfloor \frac{\pi}{\arcsin\sqrt{\sin(W/4)(d(\emptyset)^2 + \Delta h^2)/d(\emptyset))}} \right\rfloor \quad \text{(Eq. 3)}$$

In some examples, the deployment area 102 can alternatively be a space without walls. For example, the deployment area 102 may be the inside of an airplane. In some examples, the access points 102 may therefore be distributed along the ceiling of the deployment area 102. Given the height of the ceiling, a height difference can be fixed at (insert equation). Therefore, the area of the covered range can be approximately determined using the angle of the AP-client link to horizontal space, via the equation:

$$\pi\left(\frac{\Delta h \tan(W/2)}{\sin\theta}\right)^2 \quad \text{(Eq. 4)}$$

At the same time, the number of simultaneous streams $m(\theta)$ with slope $\theta$ and a beam width W at the same location can be calculated using the equation:

$$m(\theta) = \left\{ \begin{array}{l} \left\lfloor \dfrac{\pi}{\arcsin\left(\dfrac{\sin\left(\dfrac{W}{4}\right)}{\cos(\theta)}\right)} \right\rfloor \text{ if } \theta + W/4 < \pi/2 \\ 1 \end{array} \right. \quad \text{(Eq. 5)}$$

Thus, an optimal density of AP deployment for ceiling placement of APs can be calculated using the equation:

$$\operatorname*{argmax}_{\theta_1 - \theta_n} = \sum_{i=1}^{n} \frac{m(\theta_i)}{\pi\left(\dfrac{\Delta h \tan(W/2)}{\sin\theta}\right)^2} \quad \text{(Eq. 6)}$$

For example, where client device height $h_{client}=1$ meter and AP height $h_{AP}=3$ meters, and AP beam width $W=\pi/2$, the AP deployment density can be one AP per 5 square meters.

The diagram of FIG. 1 is not intended to indicate that the example operating environment 100 is to include all of the components shown in FIG. 1. Rather, the example operating environment 100 can include fewer or additional components not illustrated in FIG. 1 (e.g., additional central controllers, client devices, etc.).

Figure 2:
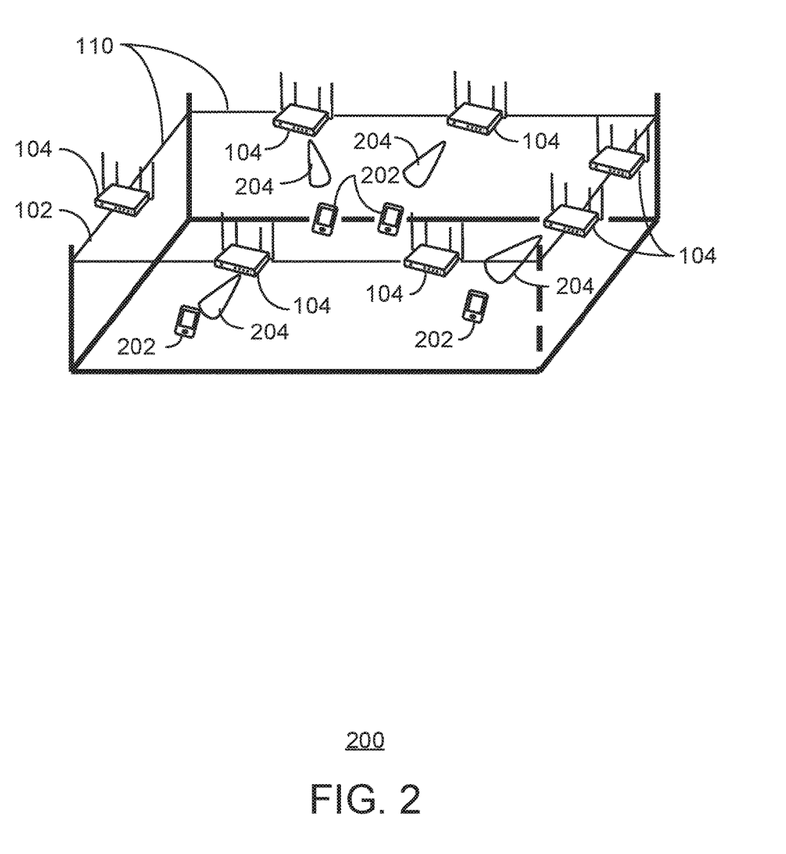
FIG. 2 is a another block diagram of an example operating environment configured for implementing various aspects of the techniques described herein.

FIG. 2 is a block diagram of another example operating environment configured for implementing various aspects of the techniques described herein. The example operating environment of FIG. 2 is referred to generally by the reference number 200.

The example operating environment 200 includes a plurality of APs 104 distributed in a plane 110 above a plurality of client devices 202. Some of the plurality of APs 104 are shown transmitting beamformed signals 204 to the plurality of client devices 202. As used herein, a beamformed signal is a signal that is directed using any appropriate beamforming technique, such as may include the use of phased-array antennas.

In the example operating environment 200, a two layer transmission architecture is illustrated. A client layer including the plurality of client devices 202 is beneath an AP layer 110 including the plurality of APs 104.

In some examples, the plurality of APs 104 can be managed by a central controller (not shown) to send and receive directed signals 204. For example, the directed signals 204 may be beamformed using any appropriate beamforming technique, such as the use of phased-array antennas. Each client device 202 can be associated with a subset of the plurality of APs 104. For example, the central controller may allocate a subset of APs to each client device based on a variety of factors including a calculated location of at least one blocking object. The central controller may calculate the location of the blocking object and allocate the subset of APs 104 to the client devices 202 according to the method 300 discussed at length below with respect to FIG. 3. In addition, the central controller may control scheduling of transmissions at the APs 104 via the method 400 discussed at greater length below with respect to FIG. 4. For example, collisions between clients attempting to use the same AP may be prevented by using an AP-client association table at the central controller. Furthermore, interference-free configurations can be updated and stored in an AP configuration mask representing beamforming configurations that are free of interference. Thus, the probability of spatial reuse in a targeted dense deployment area can be increased, benefitted by an AP placement strategy that has enabled multiple APs to be able to reach a client simultaneously. Given multiple APs to transmit, it becomes easier to capture a spatial reuse chance from the directionality of clients as clients from the same location can connect to APs with different directions. Associating a client with multiple APs also improves the robustness of the system. For example, if the communication quality is downgraded significantly, the client can efficiently recover its communication by immediately switching to other APs which have been configured beforehand. The existence of sufficient backup options also reduces runtime reconfiguration costs.

The diagram of FIG. 2 is not intended to indicate that the example operating environment 200 is to include all of the components shown in FIG. 2. Rather, the example operating environment 200 can include fewer or additional components not illustrated in FIG. 2 (e.g., additional access points, client devices, etc.).

Figure 3:
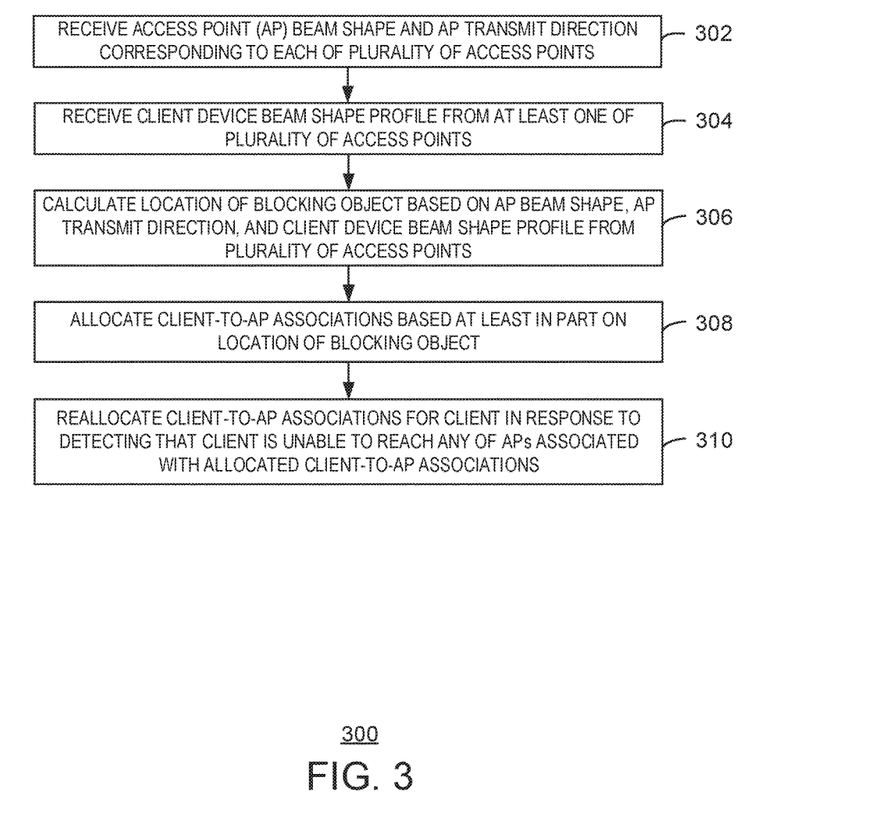
FIG. 3 is a process flow diagram of an example method for managing a wireless network.

FIG. 3 shows a process flow diagram of an example method for managing a wireless network. The example method is generally referred to by the reference number 300. The example method 300 can be performed by the central controller 108 of FIG. 1 above. For example, the method 300 may be implemented in the Medium Access Control (MAC) protocol of the central controller 108.

At block 302, the central controller receives an access point (AP) beam shape and an AP transmit direction corresponding to each of a plurality of access points. A transmit direction, as used herein, refers to a direction of a transmitted beamformed signal. For example, each access point may have a different beam shape and available transmit directions. As used herein, a beam shape refers to a two-dimensional shape of a beamformed signal. In some examples, an access point may transmit and receive data from a greater distance from one side of the access point. Accordingly, each access point may transmit data to a client device from varying distances depending on the location of the client device in relation to the access point.

At block 304, the central controller receives a client device beam shape profile from at least one of the plurality of access points. For example, each client may have a different profile of beam shape. In some examples, a beam shape profile for each client device can be calculated for each client device. For example, the beam shape profile can include a beam width over distance and a maximum distances of a beamformed signal for the client device. In some examples, the beam shape profile may be provided by each device to the access points.

At block 306, the central controller calculates a location of a blocking object based on the AP beam shape, the AP transmit direction, and the client device beam shape profile from the plurality of access points. For example, the transmit direction may be a three dimensional direction. For example, loss of signal from one or more clients given a particular AP transmit direction, AP beam shape, and client device beam shape profile, may indicate an object blocking a line-of-sight connections between the APs and clients. In some examples, the central controller can calculate a three dimensional location for each access point based on an access point count and a shape of a deployment area. For example, the location for each access point can be based on an even distribution of the number of access points in the deployment area. In some examples, additional factors such as average height of a client device, may be used to calculate a location for each access point.

At block 308, the central controller allocates client-to-AP associations based at least in part on the location of one or more blocking objects. In some examples, the central controller can allocate a set of APs to a client device from a set of access points of the plurality of access points associated with a detected signal power that exceeds a threshold signal power. For example, APs that have a line-of-sight to a client blocked by the blocking object may not be allocated to the blocked client. In some examples, the central controller can allocate a set of APs to the client from a set of access points associated with a detected signal power from the client device that exceeds a threshold signal power. For example, a client may keep sweeping through all candidate beamforming configurations. All reachable APs may have low traffic demands or smaller service workloads, or less associated clients. A plurality N of APs $AP_1; AP_2 \ldots AP_N$ may be listening to the client and to determine the configuration of beamforming for each AP. For example, a subset n out of the N APs may detect sufficient signal power from the client and thus potentially establish a link with the client with configurations. In some examples, a subset k of the subset n APs can be grouped into an AP set. A single client is associated with a single AP set at any time. The client-AP associations can be stored in the central controller with the k configurations. At the same time the pair k configurations for a client can be stored in the memory of the client. In some examples, the subset k APs can be selected based on the distance between the APs in the subset k of the APs and a number of clients transmitting data via the subset k of APs. Thus, if communication quality is downgraded significantly, a client can efficiently recover its communication by immediately switching to other APs in the k subset which have been configured beforehand. The existence of sufficient backup options can thus reduce runtime reconfiguration cost. In some examples, the central controller may then initiate a transmission between a client device and an access point from the plurality of access points by detecting availability of the access point based on a combination of an AP-client association table and an AP configuration mask as discussed with respect to FIG. 4 below.

At block 312, the central controller reallocates the client-to-AP associations for a client in response to detecting that the client is unable to reach any of the APs associated with the allocated client-to-AP associations. For example, the central controller may allocate a new set of client-to-AP associations based on an updated location of one or more blocking objects. In some examples, the central controller may receive beamforming configurations that are free of interference from one or more access points that are not connected with any client device.

In one embodiment, the process flow diagram of FIG. 3 is intended to indicate that the steps of the method 300 are to be executed in a particular order. Alternatively, in other embodiments, the steps of the method 300 can be executed in any suitable order and any suitable number of the steps of the method 300 can be included. Further, any number of additional steps may be included within the method 300, depending on the specific application.

Figure 4:
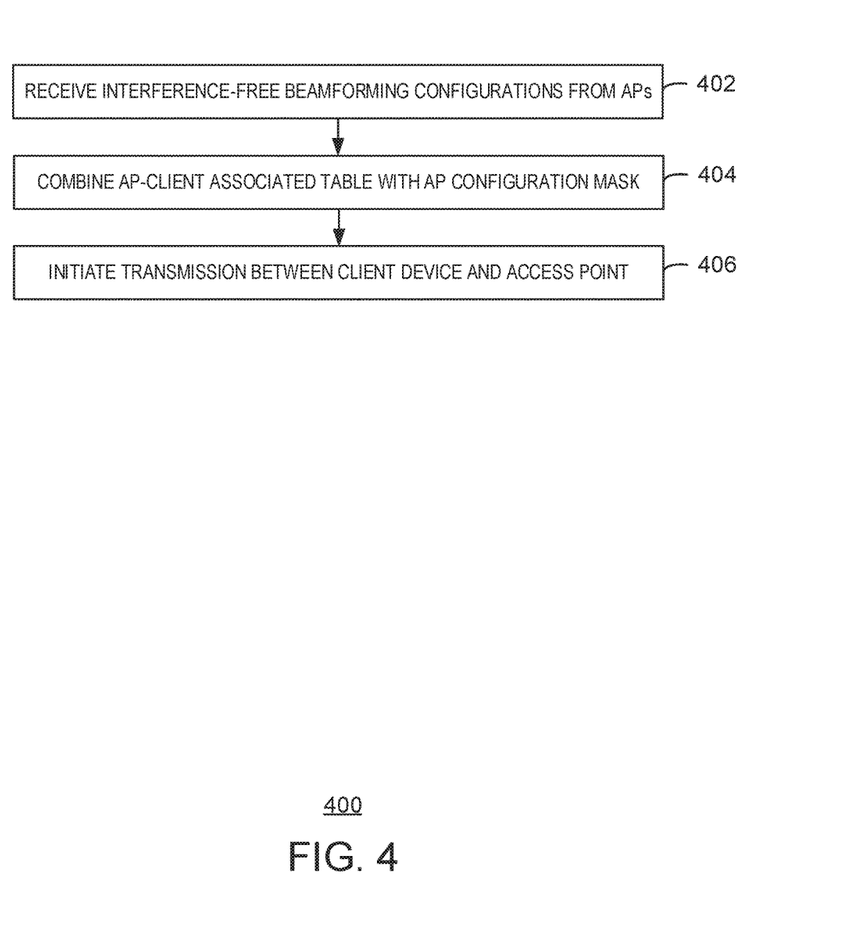
FIG. 4 is a process flow diagram of an example method for scheduling transmissions in a wireless network.

FIG. 4 shows a process flow diagram of an example method for scheduling transmissions in a wireless network. The example method is generally referred to by the reference number 400 and can be implemented using computer 502 as described below. The example method 400 can also be performed by the central controller 108 of FIG. 1 above. For example, the method 400 may be implemented in the MAC protocol of the central controller 108.

At block 402, the central controller receives interference-free beamforming configurations from APs. For example, the beamforming configurations can be a set of three dimensional transmission directions that are free from interference between an access point and a client device at any moment. The APs sending the interference-free beamforming configurations may be one or more access points that are not connected with any client devices. In some examples, the beamforming configurations can be continuously updated from the APs. For example, APs that are not connected to any client device can monitor their spectrum and detect which beamforming configurations are free from interference. In some examples, a list of interference-free beamforming configurations can be sent to the central controller at regular intervals.

At block 404, the central controller combines an AP-client association table with an AP configuration mask. For example, the AP configuration mask may represent an updated set of interference-free beamforming configurations. The AP-client association table can include a plurality of client devices, each client device associated with a plurality of APs. In some examples, the central controller can determine which APs in the AP-client association table are not connected to any client and thus free. The central controller may then determine which of the free APs also have a beam forming configuration that is interference free. The central controller can then schedule free APs with interference-free beam forming configurations as available for a link.

At block 406, the central controller initiates a transmission between a client device and an access point. For example, the central controller can initiate a data link or transmission of data between a client device and an access point based on various conditions. For example, the conditions can include the distance between a selected access point and additional access points in a network, and the width of the beam transmitted from the access point. For example, the beam width can be calculated using the AP beam shape received from the access point in 304 above. In some embodiments, selecting the AP-client pair can be based on whether additional transmitting access points are either physically apart from the selected access point beyond a threshold distance or the three dimensional direction of the AP transmission differs by at least half the beam width of the access point.

FIG. 5 is a block diagram of an example system for managing wireless communication. The example system 500 includes a computing device 502. The computing device 502 includes a processing unit 504, a system memory 506, and a system bus 508. For example, the computing device 502 may be the host device 102 or the client device 104 of FIG. 1 above. In some examples, the computing device 502 can be a router, a server, a gaming console, a personal computer (PC), among other computing devices. In some examples, the computing device 502 can be a node in a cloud network. For example, the computing device 502 can be the central controller 108 of FIG. 1 above.

The system bus 508 couples system components including, but not limited to, the system memory 506 to the processing unit 504. The processing unit 504 can be any of various available processors. Dual microprocessors and other multiprocessor architectures also can be employed as the processing unit 504.

The system bus 508 can be any of several types of bus structure, including the memory bus or memory controller, a peripheral bus or external bus, and a local bus using any variety of available bus architectures known to those of ordinary skill in the art. The system memory 506 includes computer-readable storage media that includes volatile memory 510 and nonvolatile memory 512.

The basic input/output system (BIOS), containing the basic routines to transfer information between elements within the computer 502, such as during start-up, is stored in nonvolatile memory 512. By way of illustration, and not limitation, nonvolatile memory 512 can include read-only memory (ROM), programmable ROM (PROM), electrically programmable ROM (EPROM), electrically erasable programmable ROM (EEPROM), or flash memory.

Volatile memory 510 includes random access memory (RAM), which acts as external cache memory. By way of illustration and not limitation. RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 502 also includes other computer-readable media, such as removable/non-removable, volatile/non-volatile computer storage media. FIG. 5 shows, for example a disk storage 514. Disk storage 514 includes, but is not limited to, devices like a magnetic disk drive, floppy disk drive, tape drive, Jaz drive, Zip drive, LS-210 drive, flash memory card, or memory stick.

In addition, disk storage 514 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 514 to the system bus 508, a removable or non-removable interface is typically used such as interface 516.

It is to be appreciated that FIG. 5 describes software that acts as an intermediary between users and the basic computer resources described in the suitable operating environment 500. Such software includes an operating system 518. Operating system 518, which can be stored on disk storage 514, acts to control and allocate resources of the computer 502.

System applications 520 take advantage of the management of resources by operating system 518 through program modules 522 and program data 524 stored either in system memory 506 or on disk storage 514. It is to be appreciated that the disclosed subject matter can be implemented with various operating systems or combinations of operating systems.

A user enters commands or information into the computer 502 through input devices 526. Input devices 526 include, but are not limited to, a pointing device, such as, a mouse, trackball, stylus, and the like, a keyboard, a microphone, a joystick, a satellite dish, a scanner, a TV tuner card, a digital camera, a digital video camera, a web camera, and the like. In some examples, input device can include Natural User Interface (NUI) devices. NUI refers to any interface technology that enables a user to interact with a device in a "natural" manner, free from artificial constraints imposed by input devices such as mice, keyboards, remote controls, and the like. In some examples, NUI devices include devices relying on speech recognition, touch and stylus recognition, gesture recognition both on screen and adjacent to the screen, air gestures, head and eye tracking, voice and speech, vision, touch, gestures, and machine intelligence. For example, NUI devices can include touch sensitive displays, voice and speech recognition, intention and goal understanding, and motion gesture detection using depth cameras such as stereoscopic camera systems, infrared camera systems, RGB camera systems and combinations of these. NUI devices can also include motion gesture detection using accelerometers or gyroscopes, facial recognition, three-dimensional (3D) displays, head, eye, and gaze tracking, immersive augmented reality and virtual reality systems, all of which provide a more natural interface. NUI devices can also include technologies for sensing brain activity using electric field sensing electrodes. For example, a NUI device may use Electroencephalography (EEG) and related methods to detect electrical activity of the brain. In some examples, the client device of FIG. 1 may be an input device 526 of the host device. The input devices 526 connect to the processing unit 504 through the system bus 505 via interface ports 528. Interface ports 528 include, for example, a serial port, a parallel port, a game port, and a universal serial bus (USB).

Output devices 530 use some of the same type of ports as input devices 526. Thus, for example, a USB port may be used to provide input to the computer 502, and to output information from computer 502 to an output device 530.

Output adapter 532 is provided to illustrate that there are some output devices 530 like monitors, speakers, and printers, among other output devices 530, which are accessible via adapters. The output adapters 532 include, by way of illustration and not limitation, video and sound cards that provide a means of connection between the output device 530 and the system bus 508. It can be noted that other devices and systems of devices provide both input and output capabilities such as remote computing devices 534.

The computer 502 can be a server hosting various software applications in a networked environment using logical connections to one or more remote computers, such as remote computing devices 534. The remote computing devices 534 may be client systems configured with web browsers, PC applications, mobile phone applications, and the like. The remote computing devices 534 can be a personal computer, a server, a router, a network PC, a workstation, a microprocessor based appliance, a mobile phone, a peer device or other common network node and the like, and typically includes many or all of the elements described relative to the computer 502.

Remote computing devices 534 can be logically connected to the computer 502 through a network interface 536 and then connected via a communication connection 538, which may be wireless. Network interface 536 encompasses wireless communication networks such as local-area networks (LAN) and wide-area networks (WAN). LAN technologies include Fiber Distributed Data Interface (FDDI). Copper Distributed Data Interface (CDDI), Ethernet, Token Ring and the like. WAN technologies include, but are not limited to, point-to-point links, circuit switching networks like Integrated Services Digital Networks (ISDN) and variations thereof, packet switching networks, and Digital Subscriber Lines (DSL).

Communication connection 538 refers to the hardware/software employed to connect the network interface 536 to the bus 508. While communication connection 538 is shown for illustrative clarity inside computer 502, it can also be external to the computer 502. The hardware/software for connection to the network interface 536 may include, for exemplary purposes, internal and external technologies such as, mobile phone switches, modems including regular telephone grade modems, cable modems and DSL modems, ISDN adapters, and Ethernet cards.

The computer 502 can further include a radio 540. For example, the radio 540 can be any suitable wireless local area network connection radio. In some examples, the radio 540 may support one or more wireless bands. For example, the radio 540 can support the millimeter wavelength bands, such as the 60 GHz band. In some examples, the radio 540 may be connected to one or more antennas for transmission. For example, the antennas may operate as phased-array antennas to enable beamforming of signals.

An example processing unit 504 for the server may be a computing cluster. Additionally, the disk storage 514 can store various types of data 524 used for delaying network frames. For example, the disk storage 514 may be an enterprise data storage system. In some examples, the disk storage 514 may store data 524 such as network frames to be queued.

The computer 502 includes one or more modules 522 configured to enable delaying of network frames, including an AP placement module 542, a block detection module 544, an association module 546, and a scheduling module 548. The AP placement module 542, block detection module 544, association module 546, and scheduling module 548, refer to structural elements that perform associated functions. In some embodiments, the functionalities of the AP placement module 542, block detection module 544, association module 546, and scheduling module 548, can be implemented with logic, wherein the logic, as referred to herein, can include any suitable hardware (e.g., a processor, among others), software (e.g., an application, among others), firmware, or any combination of hardware, software, and firmware. The AP placement module 542 can receive an access point (AP) beam shape and an AP transmit direction corresponding to each of a plurality of access points. In some examples, a plurality of access points can be uniformly distributed in the deployment area in a plane parallel to the ground and above the height of any client devices. For example, the plurality of access points can be distributed in a plane along the edges of a wall. In some examples, the plurality of access points can be evenly distributed in a plane along a ceiling. In some examples, the access points can be single radio frequency (RF) chain access points. The AP placement module 542 can receive a client device profile of beam shape from at least one of the plurality of access points. For example, the client device profile of beam shape can be associated with the beam shape characteristics of a client device in the deployment area. The AP placement module 542 can calculate a three dimensional location for each access point based on an AP count and a shape of a deployment area. In some examples, the AP count is based on a number of available channels, a ceiling height, and the deployment area and the plurality of access points can be distributed on the ceiling. In some examples, the access point count is based on a number of available wireless channels, an access point height, and the deployment area, wherein the plurality of access points to be distributed along walls. The block detection module 544 can calculate a location of a blocking object based on the AP beam shape, the AP transmit direction, and the client device beam shape profile from the plurality of access points. The association module 546 can allocate client-to-AP associations based at least in part on the location of the blocking object. In some examples, the association module 546 can allocate the client-to-AP associations based on a set of access points of the plurality of access points associated with a detected signal power that exceeds a threshold signal power. In some examples, the association module 546 can reallocate the client-to-AP associations in response to detecting that a client device is unable to reach any of the APs associated with the allocated client-to-AP associations. The scheduling module 548 can receive beamforming configurations that are free of interference from one or more access points that are not connected with any client device. The scheduling module 548 can initiate a transmission between a client device and an access point of the plurality of access points by detecting availability of the access point based on a combination of an AP-client association table and an AP configuration mask. In some examples, each access point is to transmit data to client devices via a first connection comprising a high-speed directed wireless connection and communicate with the processor via a separate second connection. For example, the second connection can be a wireless or a wired connection, such as an Ethernet connection.

It is to be understood that the block diagram of FIG. 5 is not intended to indicate that the computing system 500 is to include all of the components shown in FIG. 5. Rather, the computing system 500 can include fewer or additional components not illustrated in FIG. 5 (e.g., additional applications, additional modules, additional memory devices, additional network interfaces, additional MACs, etc.). Furthermore, any of the functionalities of the AP placement module 542, the block detection module 544, the association module 546, and the scheduling module 548 can be partially, or entirely, implemented in hardware and/or in a processor. For example, the functionality can be implemented with an application specific integrated circuit, in logic implemented in the processor, or in any other device. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), and Complex Programmable Logic Devices (CPLDs), etc.

Figure 6:
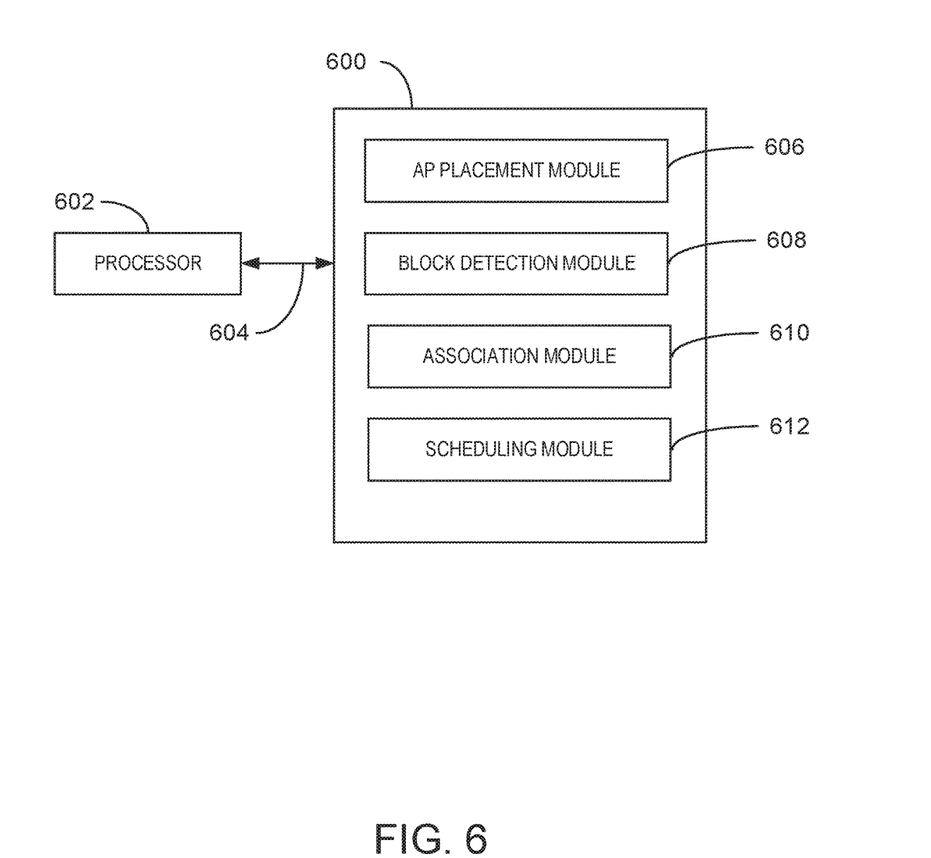
FIG. 6 is a block diagram showing an example tangible, computer-readable storage medium that can be used for management of a wireless network.

FIG. 6 is a block diagram showing an example tangible, computer-readable storage medium that can be used for management of a wireless network. The tangible, computer-readable storage media 600 can be accessed by a processor 602 over a computer bus 604. Furthermore, the tangible, computer-readable storage media 600 can include code to direct the processor 602 to perform the current methods.

The various software components discussed herein can be stored on the tangible, computer-readable storage media 600, as indicated in FIG. 6. For example, the tangible computer-readable storage media 600 can include an AP placement module 606, a block detection module 608, an association module 610, and a scheduling module 612. The AP placement module 606, block detection module 608, association module 610, and scheduling module 612, refer to structural elements that perform associated functions. In some embodiments, the functionalities of the AP placement module 606, block detection module 608, association module 610, and scheduling module 612, can be implemented with logic, wherein the logic, as referred to herein, can include any suitable hardware (e.g., a processor, among others), software (e.g., an application, among others), firmware, or any combination of hardware, software, and firmware. In some implementations, the AP placement module 606 can include code to receive an access point (AP) beam shape and an AP transmit direction corresponding to each of a plurality of access points. The AP placement module 606 can also include code to receive a client device beam shape profile from at least one of the plurality of access points. The AP placement module 606 can also include code to calculate a three dimensional location for each access point based on an AP count and a shape of a deployment area. The block detection module 608 can include code to calculate a location of a blocking object based on the AP beam shape, the AP transmit direction, the client device beam shape profile from the plurality of access points, and the calculated location of at least one access point. The association module 610 can include code to allocate client-to-AP associations based at least in part on the location of the blocking object. In some examples, association module 610 can include code to allocate the client-to-AP associations based on a set of access points of the plurality of access points associated with a detected signal power that exceeds a threshold signal power. In some examples, association module 610 can include code to reallocate the client-to-AP associations in response to detecting that a client device is unable to reach any of the APs associated with the allocated client-to-AP associations. The scheduling module 612 can include code to receive beamforming configurations that are free of interference from one or more access points that are not connected with any client device. The scheduling module 612 can also include code to initiate a transmission between a client device and an access point from the plurality of access points by detecting availability of the access point based on a combination of an AP-client association table and an AP configuration mask. For example, based on a combination of an AP-client association table with an AP configuration mask, the scheduling module 612 can detect an AP that is both free and also has a configuration for the AP-client association that is interference free. The scheduling module 612 can choose the AP client pair to be the co-existing link within these available links when any of the other working APs is either physically apart from the AP greater than a threshold distance or the three dimensional direction of the transmission differs by at least half an AP beam width W/2.

It is to be understood that any number of additional software components not shown in FIG. 6 can be included within the tangible, computer-readable storage media 600, depending on the specific application. Although the subject matter has been described in language specific to structural features and/or methods, it is to be understood that the subject matter defined in the appended claims is not necessarily limited to the specific structural features or methods described above. Rather, the specific structural features and methods described above are disclosed as example forms of implementing the claims.

EXAMPLE 1

This example provides for an example system for managing wireless communication. The example system includes a processor and a computer-readable memory storage device storing executable instructions. The executable instructions can cause the processor to receive an access point (AP) beam shape and an AP transmit direction corresponding to each of a plurality of access points. The executable instructions can cause the processor to receive a client device beam shape profile from at least one of the plurality of access points. The executable instructions can cause the processor to calculate a three-dimensional location for each access point based on an AP count and a shape of a deployment area. The executable instructions can cause the processor to calculate a location of a blocking object based on the AP beam shape, the AP transmit direction, and the client device beam shape profile from the plurality of access points. The executable instructions can cause the processor to allocate client-to-AP associations based at least in part on the location of the blocking object. Alternatively, or in addition, the processor can allocate the client-to-AP associations based on a set of access points of the plurality of access points associated with a detected signal power that exceeds a threshold signal power. Alternatively, or in addition, the processor can further reallocate the client-to-AP associations in response to detecting that a client device is unable to reach any of the APs associated with the allocated client-to-AP associations. Alternatively, or in addition, the processor can further receive beamforming configurations that are free of interference from one or more access points that are not connected with any client device. Alternatively, or in addition, the processor can initiate a transmission between a client device and an access point of the plurality of access points by detecting availability of the access point based on a combination of an AP-client association table and an AP configuration mask. Alternatively, or in addition, at least one of the plurality of access points includes a single radio frequency (RF) chain access point. Alternatively, or in addition, the plurality of access points are to be uniformly distributed in the deployment area in a plane parallel to the ground and above the height of any client devices. Alternatively, or in addition, the access point count is based on a number of available wireless channels, a ceiling height, and the deployment area, wherein the plurality of access points are to be distributed on the ceiling. Alternatively, or in addition, the access point count is based on a number of available wireless channels, an access point height, and the deployment area, wherein the plurality of access points are to be distributed along walls. Alternatively, or in addition, each access point is to transmit data to client devices via a first connection including a high-speed directed wireless connection and communicate with the processor via a separate second connection.

EXAMPLE 2

This example provides for an example method for managing a wireless network. The example method includes receiving, via a processor, an access point (AP) beam shape and an AP transmit direction corresponding to each of a plurality of access points. The example method also includes receiving, via a processor, a client device beam shape profile from at least one of the plurality of access points. The example method includes calculating, via the processor, a location of a blocking object based on the AP beam shape, the AP transmit direction, and the client device beam shape profile from the plurality of access points. The example method further also includes allocating, via the processor, client-to-AP associations based at least in part on the location of the blocking object. Alternatively, or in addition, allocating the client-to-AP associations further includes allocating a set of APs to a client device from a set of access points of the plurality of access points associated with a detected signal power that exceeds a threshold signal power. Alternatively, or in addition, the example method can include reallocating, via the processor, the client-to-AP associations in response to detecting that a client device is unable to reach any of the APs associated with the allocated client-to-AP associations. Alternatively, or in addition, the example method can include receiving, via the processor, beamforming configurations that are free of interference from one or more access points that are not connected with any client device. Alternatively, or in addition, the example method can include initiating, via the processor, a transmission between a client device and an access point from the plurality of access points by detecting availability of the access point based on a combination of an AP-client association table and an AP configuration mask.

EXAMPLE 3

This example provides for an example one or more computer-readable memory storage devices for storing computer readable instructions that, when executed by one or more processing devices, instruct the management of a wireless network. The computer-readable instructions may include code to. The computer-readable instructions may include code to. The computer-readable instructions may include code to receive an access point (AP) beam shape and an AP transmit direction corresponding to each of a plurality of access points. The computer-readable instructions may include code to receive a client device beam shape profile from at least one of the plurality of access points. The computer-readable instructions may include code to calculate a three dimensional location for each access point based on an AP count and a shape of a deployment area. The computer-readable instructions may include code to calculate a location of a blocking object based on the AP beam shape, the AP transmit direction, the client device beam shape profile from the plurality of access points, and the calculated location of at least one access point. The computer-readable instructions may include code to allocate client-to-AP associations based at least in part on the location of the blocking object. Alternatively, or in addition, the computer-readable instructions may include code to allocate the client-to-AP associations based on a set of access points of the plurality of access points associated with a detected signal power that exceeds a threshold signal power. Alternatively, or in addition, the computer-readable instructions may include code to reallocate the client-to-AP associations in response to detecting that a client device is unable to reach any of the APs associated with the allocated client-to-AP associations. Alternatively, or in addition, the computer-readable instructions may include code to receive beamforming configurations that are free of interference from one or more access points that are not connected with any client device. Alternatively, or in addition, the computer-readable instructions may include code to initiate a transmission between a client device and an access point from the plurality of access points by detecting availability of the access point based on a combination of an AP-client association table and an AP configuration mask.

EXAMPLE 4

This example provides for an example system for managing wireless communication. The example system includes means for receiving an access point (AP) beam shape and an AP transmit direction corresponding to each of a plurality of access points. The example system includes means for receiving a client device beam shape profile from at least one of the plurality of access points. The example system includes means for calculating a three-dimensional location for each access point based on an AP count and a shape of a deployment area. The example system includes means for calculating a location of a blocking object based on the AP beam shape, the AP transmit direction, and the client device beam shape profile from the plurality of access points. The example system includes means for allocating client-to-AP associations based at least in part on the location of the blocking object. Alternatively, or in addition, the means for allocating client-to-AP associations can allocate the client-to-AP associations based on a set of access points of the plurality of access points associated with a detected signal power that exceeds a threshold signal power. Alternatively, or in addition, the means for allocating client-to-AP associations can further reallocate the client-to-AP associations in response to detecting that a client device is unable to reach any of the APs associated with the allocated client-to-AP associations. Alternatively, or in addition, the means for allocating client-to-AP associations can further receive beamforming configurations that are free of interference from one or more access points that are not connected with any client device. Alternatively, or in addition, the means for allocating client-to-AP associations can initiate a transmission between a client device and an access point of the plurality of access points by detecting availability of the access point based on a combination of an AP-client association table and an AP configuration mask. Alternatively, or in addition, at least one of the plurality of access points includes a single radio frequency (RF) chain access point. Alternatively, or in addition, the plurality of access points are to be uniformly distributed in the deployment area in a plane parallel to the ground and above the height of any client devices. Alternatively, or in addition, the access point count is based on a number of available wireless channels, a ceiling height, and the deployment area, wherein the plurality of access points are to be distributed on the ceiling. Alternatively, or in addition, the access point count is based on a number of available wireless channels, an access point height, and the deployment area, wherein the plurality of access points are to be distributed along walls. Alternatively, or in addition, each access point is to transmit data to client devices via a first connection including a high-speed directed wireless connection and communicate with the processor via a separate second connection.

What has been described above includes examples of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the disclosed subject matter. In this regard, it will also be recognized that the innovation includes a system as well as a computer-readable storage media having computer-executable instructions for performing the acts and events of the various methods of the disclosed subject matter.

There are multiple ways of implementing the disclosed subject matter, e.g., an appropriate API, tool kit, driver code, operating system, control, standalone or downloadable software object, etc., which enables applications and services to use the techniques described herein. The disclosed subject matter contemplates the use from the standpoint of an API (or other software object), as well as from a software or hardware object that operates according to the techniques set forth herein. Thus, various implementations of the disclosed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the disclosed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system for managing wireless communication, comprising:
   a processor; and
   a computer-readable memory storage device storing executable instructions that,
      based on an execution by the processor, cause the processor to:
      receive an access point (AP) beam shape and an AP transmit direction corresponding to each of a plurality of access points;
      receive a client device beam shape profile calculated for a client device from at least one of the plurality of access points, the client device beam shape profile comprising a maximum distance of a beamformed signal for the client device;
      calculate a three-dimensional location for each access point based on an AP count and a shape of a deployment area;

calculate a location of a blocking object that blocks a line-of-sight between the client device and at least one of the plurality of access points based on the AP beam shape, the AP transmit direction, and the client device beam shape profile from the plurality of access points; and allocate client-to-AP associations based at least in part on the location of the blocking object and the three-dimensional location for each of the access points, wherein the client-to-AP associations are allocated such that the blocking object is not in a line-of-sight between the client device and access points of the plurality of access points included in the client-to-AP associations for the client device.

2. The system of claim 1, wherein the processor is to allocate the client-to-AP associations based on a set of access points of the plurality of access points associated with a detected signal power that exceeds a threshold signal power.

3. The system of claim 1, wherein the processor is to further reallocate the client-to-AP associations in response to detecting that a client device is unable to reach any of the APs associated with the allocated client-to-AP associations.

4. The system of claim 1, wherein the processor is to further receive beamforming configurations that are free of interference from one or more access points that are not connected with any client device.

5. The system of claim 1, wherein the processor is to initiate a transmission between a client device and an access point of the plurality of access points by detecting availability of the access point based on a combination of an AP-client association table and an AP configuration mask.

6. The system of claim 1, wherein at least one of the plurality of access points comprises a single radio frequency (RF) chain access point.

7. The system of claim 1, wherein the plurality of access points are to be uniformly distributed in the deployment area in a plane parallel to the ground and above the height of any client devices.

8. The system of claim 1, wherein the access point count is based on a number of available wireless channels, a ceiling height, and the deployment area, wherein the plurality of access points are to be distributed on the ceiling.

9. The system of claim 1, wherein the access point count is based on a number of available wireless channels, an access point height, and the deployment area, wherein the plurality of access points are to be distributed along walls.

10. The system of claim 1, wherein each access point is to transmit data to client devices via a first connection comprising a high-speed directed wireless connection and communicate with the processor via a separate second connection.

11. A method for managing a wireless network, comprising:

receiving, via a processor, an access point (AP) beam shape and an AP transmit direction corresponding to each of a plurality of access points;

receiving, via a processor, a client device beam shape profile calculated for a client device from at least one of the plurality of access points, the client device beam shape profile comprising a maximum distance of a beamformed signal for the client device;

calculating, via the processor, a location of a blocking object that blocks a line-of-sight between the client device and at least one of the plurality of access points based on the AP beam shape, the AP transmit direction, and the client device beam shape profile from the plurality of access points; and allocating, via the processor, client-to-AP associations based at least in part on the location of the blocking object and a three-dimensional location for each of the access points, wherein the client-to-AP associations are allocated such that the blocking object is not in a line-of-sight between the client device and access points from the plurality of access points included in the client-to-AP associations for the client device.

12. The method of claim 11, wherein allocating the client-to-AP associations further comprises allocating a set of APs to a client device from a set of access points of the plurality of access points associated with a detected signal power that exceeds a threshold signal power.

13. The method of claim 11, further comprising reallocating, via the processor, the client-to-AP associations in response to detecting that a client device is unable to reach any of the APs associated with the allocated client-to-AP associations.

14. The method of claim 11, further comprising receiving, via the processor, beamforming configurations that are free of interference from one or more access points that are not connected with any client device.

15. The method of claim 11, further comprising initiating, via the processor, a transmission between a client device and an access point from the plurality of access points by detecting availability of the access point based on a combination of an AP-client association table and an AP configuration mask.

16. One or more computer-readable memory storage devices for storing computer readable instructions that, based on at least an execution by one or more processing devices, instruct the management of a wireless network, the computer-readable instructions comprising code to:

receive an access point (AP) beam shape and an AP transmit direction corresponding to each of a plurality of access points;

receive a client device beam shape profile calculated for a client device from at least one of the plurality of access points, the client device beam shape profile comprising a maximum distance of a beamformed signal for the client device;

calculate a three dimensional location for each access point based on an AP count and a shape of a deployment area;

calculate a location of a blocking object that blocks a line-of-sight between the client device and at least one of the plurality of access points based on the AP beam shape, the AP transmit direction, the client device beam shape profile from the plurality of access points, and the calculated location of at least one access point; and allocate client-to-AP associations based at least in part on the location of the blocking object and the three-dimensional location for each of the access points, wherein the client-to-AP associations are allocated such that the blocking object is not in a line-of-sight of access points of the plurality of access points included in the client-to-AP associations for the client device.

17. The one or more computer-readable memory storage devices of claim 16, further comprising code to allocate the client-to-AP associations based on a set of access points of the plurality of access points associated with a detected signal power that exceeds a threshold signal power.

18. The one or more computer-readable memory storage devices of claim 16, further comprising code to reallocate the client-to-AP associations in response to detecting that a client device is unable to reach any of the APs associated with the allocated client-to-AP associations.

19. The one or more computer-readable memory storage devices of claim 16, further comprising code to receive beamforming configurations that are free of interference from one or more access points that are not connected with any client device.

20. The one or more computer-readable memory storage devices of claim 16, further comprising code to initiate a transmission between a client device and an access point from the plurality of access points by detecting availability of the access point based on a combination of an AP-client association table and an AP configuration mask.

21. The system of claim 1, wherein the client device beam shape profile comprises a beam width over a distance and a maximum distance of a beamformed signal for the client device.

\* \* \* \* \*